(12) United States Patent
Yokoyama

(10) Patent No.: US 7,131,072 B2
(45) Date of Patent: Oct. 31, 2006

(54) COMMAND INPUT DEVICE, COMMAND INPUT METHOD, AND STORAGE MEDIUM

(75) Inventor: Noriyasu Yokoyama, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 442 days.

(21) Appl. No.: 10/113,570

(22) Filed: Apr. 2, 2002

(65) Prior Publication Data
US 2003/0107598 A1 Jun. 12, 2003

(30) Foreign Application Priority Data
Dec. 10, 2001 (JP) ............... 2001-375911

(51) Int. Cl.
*G06F 3/00* (2006.01)
(52) U.S. Cl. ............... 715/844; 715/845; 715/840; 715/814; 715/707; 715/736; 715/785; 715/786; 715/823
(58) Field of Classification Search ............... 715/844, 715/845, 814, 840, 823, 786, 707, 736, 785
See application file for complete search history.

(56) References Cited

U.S. PATENT DOCUMENTS

| 5,018,082 | A | * | 5/1991 | Obata et al. ............... 715/707 |
| 5,786,819 | A | * | 7/1998 | Weiser et al. ............... 715/840 |
| 5,818,361 | A | * | 10/1998 | Acevedo ............... 341/23 |
| 6,727,830 | B1 | * | 4/2004 | Lui et al. ............... 341/20 |
| 6,748,055 | B1 | * | 6/2004 | Borman et al. ............... 379/88.14 |

FOREIGN PATENT DOCUMENTS

| JP | 2-151128 | 6/1990 |
| JP | 3-25931 | 3/1991 |
| JP | 6-149517 | 5/1994 |
| JP | 6-318126 | 11/1994 |
| JP | 6-342361 | 11/1994 |
| JP | 08-221203 | 8/1996 |
| JP | 8-234954 | 9/1996 |
| JP | 9-114624 | 5/1997 |
| JP | 2000-207084 | 7/2000 |
| JP | 2000-267792 | 9/2000 |
| JP | 2001-222353 | 8/2001 |

OTHER PUBLICATIONS

Steinberg, Michael. "Sams Teach Yourself PalmPilot and Palm III in 10 Minutes". 1999, Sams Publishing, pp. 17-19.*

* cited by examiner

*Primary Examiner*—Tadesse Hailu
*Assistant Examiner*—Michael Roswell
(74) *Attorney, Agent, or Firm*—Staas & Halsey LLP

(57) ABSTRACT

The execution process registration unit is a function unit for causing a user to register in advance the information about the process (function) that is assigned to each button, and for storing the information. A command display unit controls an initial screen display, an execution process display unit controls the screen display during operation, and a command execution unit executes the process in accordance with the operation (time), on the basis of the information that is registered in advance.

5 Claims, 12 Drawing Sheets

10

| 11 | 12 | 13 | 14 | 15 | 16 | 17 | 18 |
|---|---|---|---|---|---|---|---|
| COMMAND NAME | COMMAND ATTRIBUTE | INPUT START TIME | INPUT TERMINATION TIME | PROGRAM FILE NAME | DISPLAY WORD | ABBREVI- ATION | COMMAND COLOR |
| CALCULATION BUTTON | PROCESS IS CHANGEABLE | 0.0 SECONDS | 0.9 SECONDS | ○○○.exe | CALCULATION CONFIRMATION | CAL | GREENISH YELLOW |
|  |  | 1.0 SECONDS | 1.9 SECONDS | △△△.exe | DATA UPDATING | UPD | GREEN |
|  |  | 2.0 SECONDS |  | ×××.exe | PRINTING | PRI | DARK GREEEN |
| TERMINATION BUTTON | PROCESS IS FIXED | — | — | ●●●.exe | TERMINATING | — | GRAY |
| CANCELLATION BUTTON | PROCESS IS FIXED | — | — | ▲▲▲.exe | CANCELLATION | — | GRAY |

○○○.exe · · · · CALCULATION PROGRAM FILE
△△△.exe · · · · UPDATING PROGRAM FILE
×××.exe · · · · PRINTING PROGRAM FILE
●●●.exe · · · · TERMINATION PROGRAM FILE
▲▲▲.exe · · · · CANCELLATION PROGRAM FILE

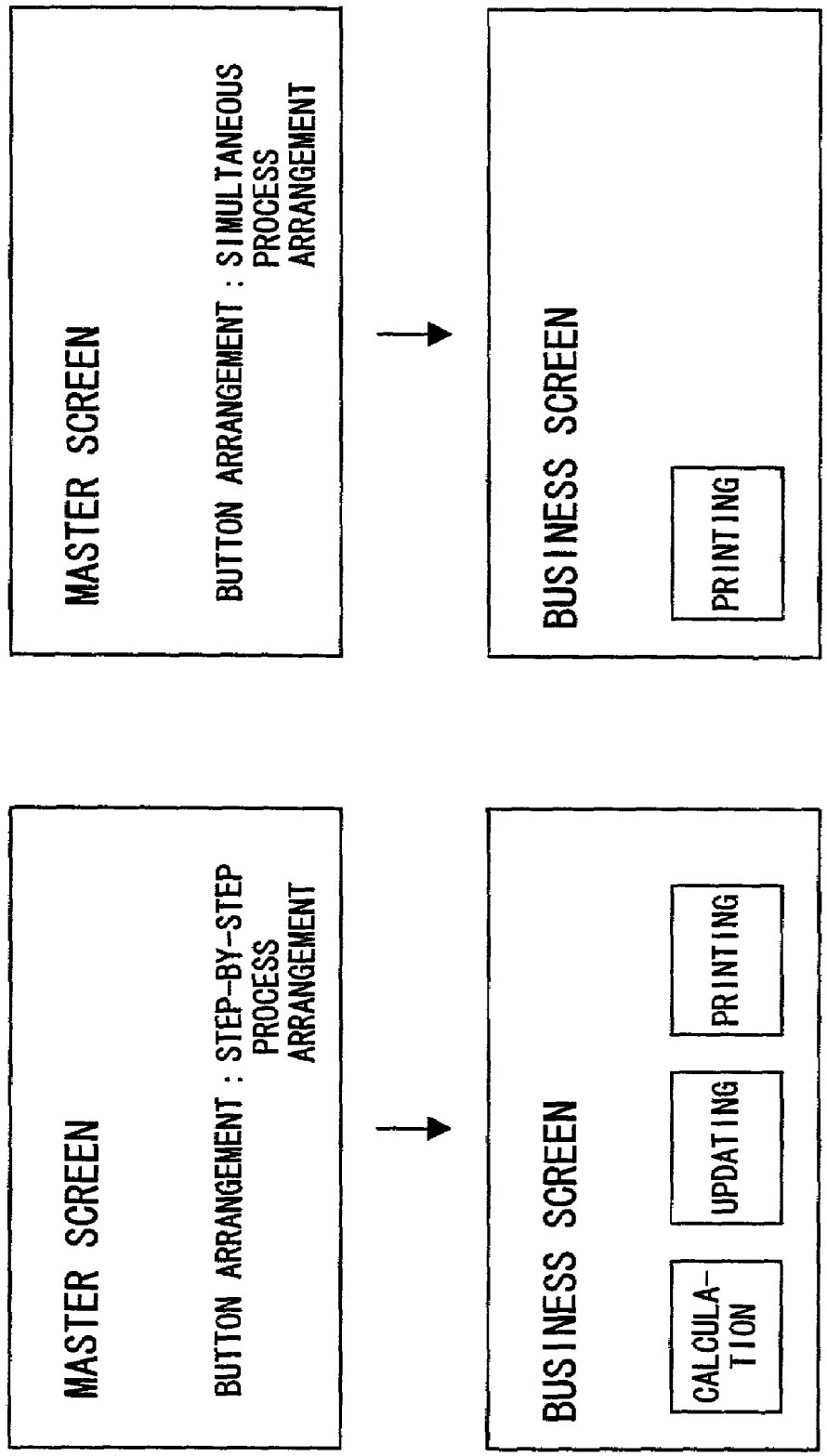

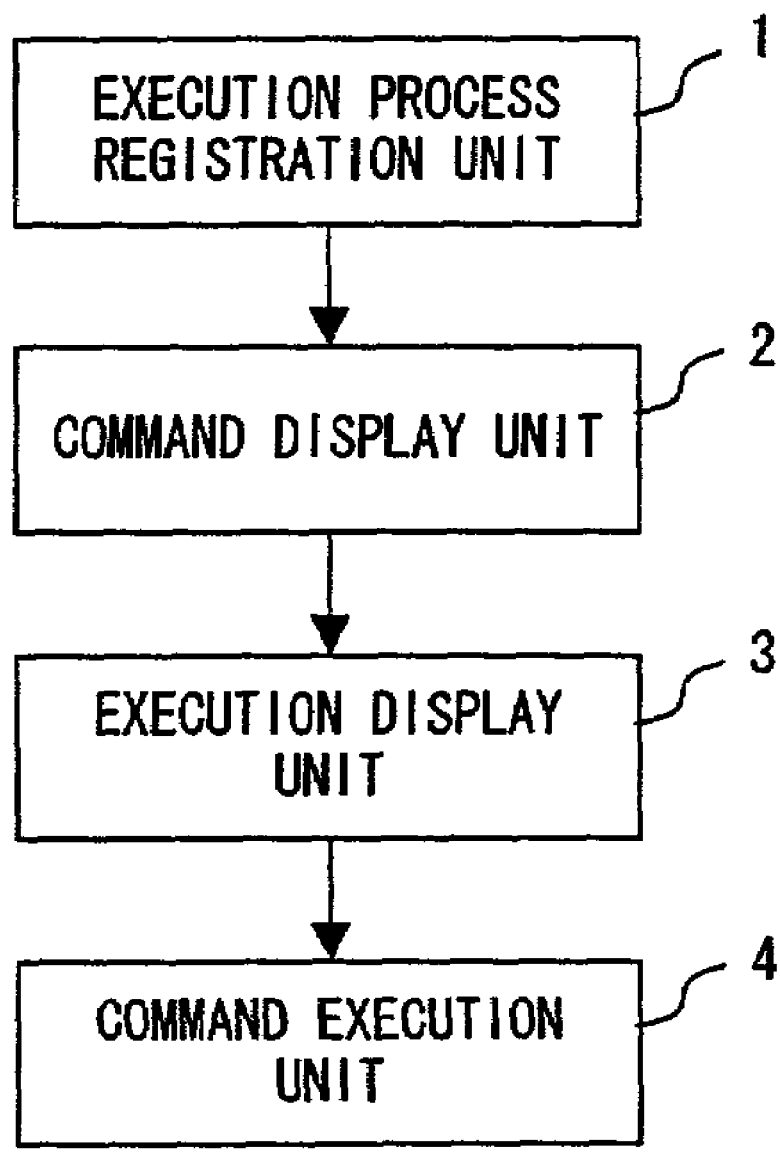
F I G. 2

| COMMAND NAME | COMMAND ATTRIBUTE | INPUT START TIME | INPUT TERMINATION TIME | PROGRAM FILE NAME | DISPLAY WORD | ABBREVI-ATION | COMMAND COLOR |
|---|---|---|---|---|---|---|---|
| CALCULATION BUTTON | PROCESS IS CHANGEABLE | 0.0 SECONDS | 0.9 SECONDS | ○○○.exe | CALCULATION CONFIRMATION | CAL | GREENISH YELLOW |
| | PROCESS IS FIXED | 1.0 SECONDS | 1.9 SECONDS | △△△.exe | DATA UPDATING | UPD | GREEN |
| | PROCESS IS FIXED | 2.0 SECONDS | — | ×××.exe | PRINTING | PRI | DARK GREEN |
| TERMINATION BUTTON | | | — | ●●●.exe | TERMINATING | — | GRAY |
| CANCELLATION BUTTON | | | — | ▲▲▲.exe | CANCELLATION | — | GRAY |

11 — COMMAND NAME
12 — COMMAND ATTRIBUTE
13 — INPUT START TIME
14 — INPUT TERMINATION TIME
15 — PROGRAM FILE NAME
16 — DISPLAY WORD
17 — ABBREVIATION
18 — COMMAND COLOR
10

○○○.exe · · · · · CALCULATION PROGRAM FILE
△△△.exe · · · · · UPDATING PROGRAM FILE
×××.exe · · · · · PRINTING PROGRAM FILE
●●●.exe · · · · · TERMINATION PROGRAM FILE
▲▲▲.exe · · · · · CANCELLATION PROGRAM FILE

FIG. 3

IN CASE OF EXECUTING CALCULATION, UPDATING, AND PRINTING PROCESSES STEP-BY-STEP

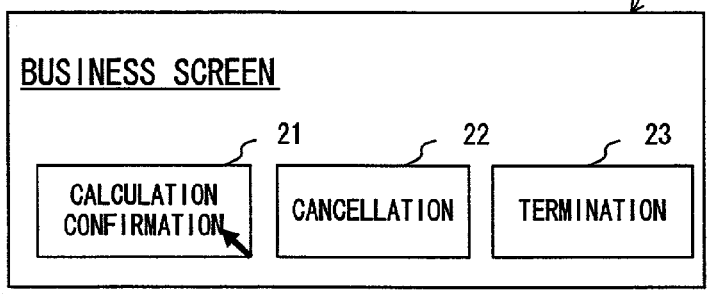

FIG. 8A (1) DEPRESSING BUTTON FOR 0.6 SECONDS (2) EXECUTING ONLY CALCULATION CONFIRMATION PROCESS OF CORRESPONDING PROCESSES BETWEEN 0.0 SECONDS AND 0.6 SECONDS, SINCE INPUT TIME DETERMINATION START SECOND NUMBER IS 0 SECONDS.

CALCULATION PROCESS EXECUTION

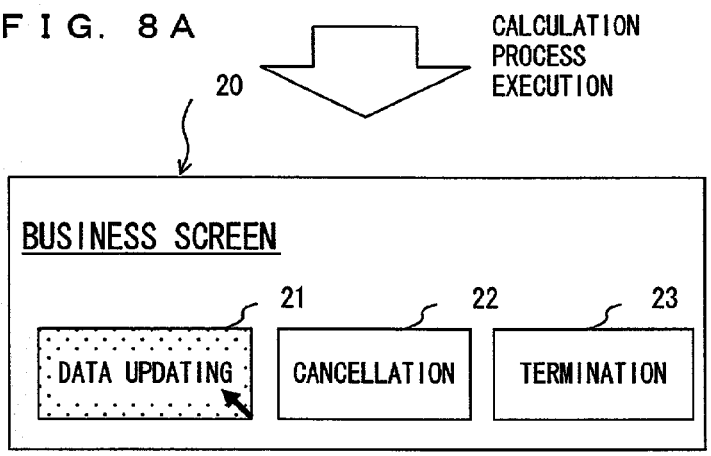

FIG. 8B (3) INITIALLY DISPLAYING DATA-UPDATING PROCESS THAT IS PROCESS OF NEXT TIME RANGE OF CALCULATION CONFIRMATION IN PROGRAM (4) DEPRESSING BUTTON FOR 0.7 SECONDS (5) EXECUTING ONLY DATA-UPDATING PROCESS OF CORRESPONDING PROCESS BETWEEN 1.0 SECONDS AND 1.7 SECONDS SINCE INPUT TIME DETERMINATION START TIME IS 1.0 SECONDS, AND 0.7 + 1.0=1.7

DATA UPDATING PROCESS EXECUTION

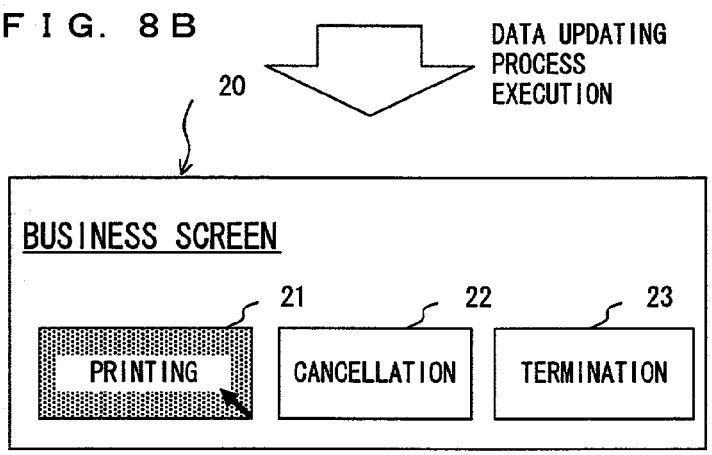

FIG. 8C (6) INITIALLY DISPLAYING PRINTING PROCESS THAT IS PROCESS OF NEXT TIME RANGE OF CALCULATION CONFIRMATION IN PROGRAM (7) DEPRESSING BUTTON FOR 0.6 SECONDS (8) EXECUTING ONLY PRINTING PROCESS OF CORRESPONDING PROCESS BETWEEN 2.0 SECONDS AND 2.6 SECONDS, SINCE INPUT TIME DETERMINATION START TIME IS 2.0 SECONDS, AND 0.6 + 2.0=2.6 SECONDS

PRINTING PROCESS EXECUTION

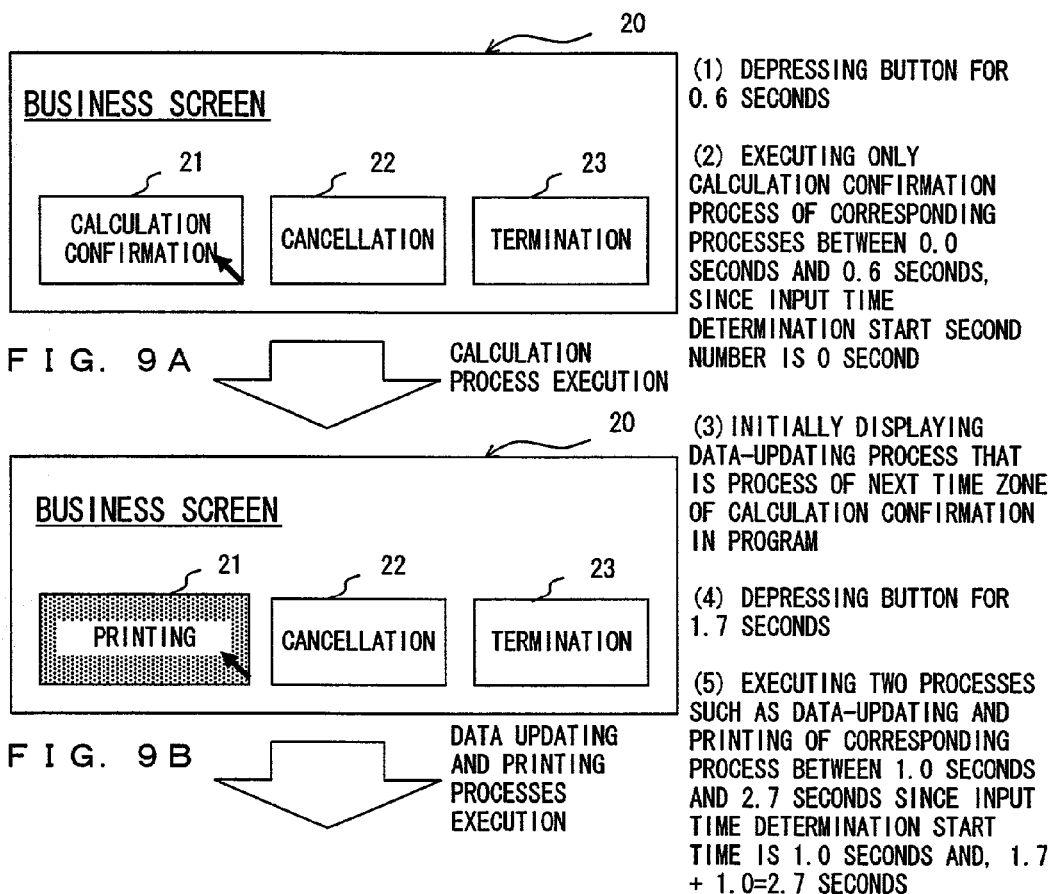

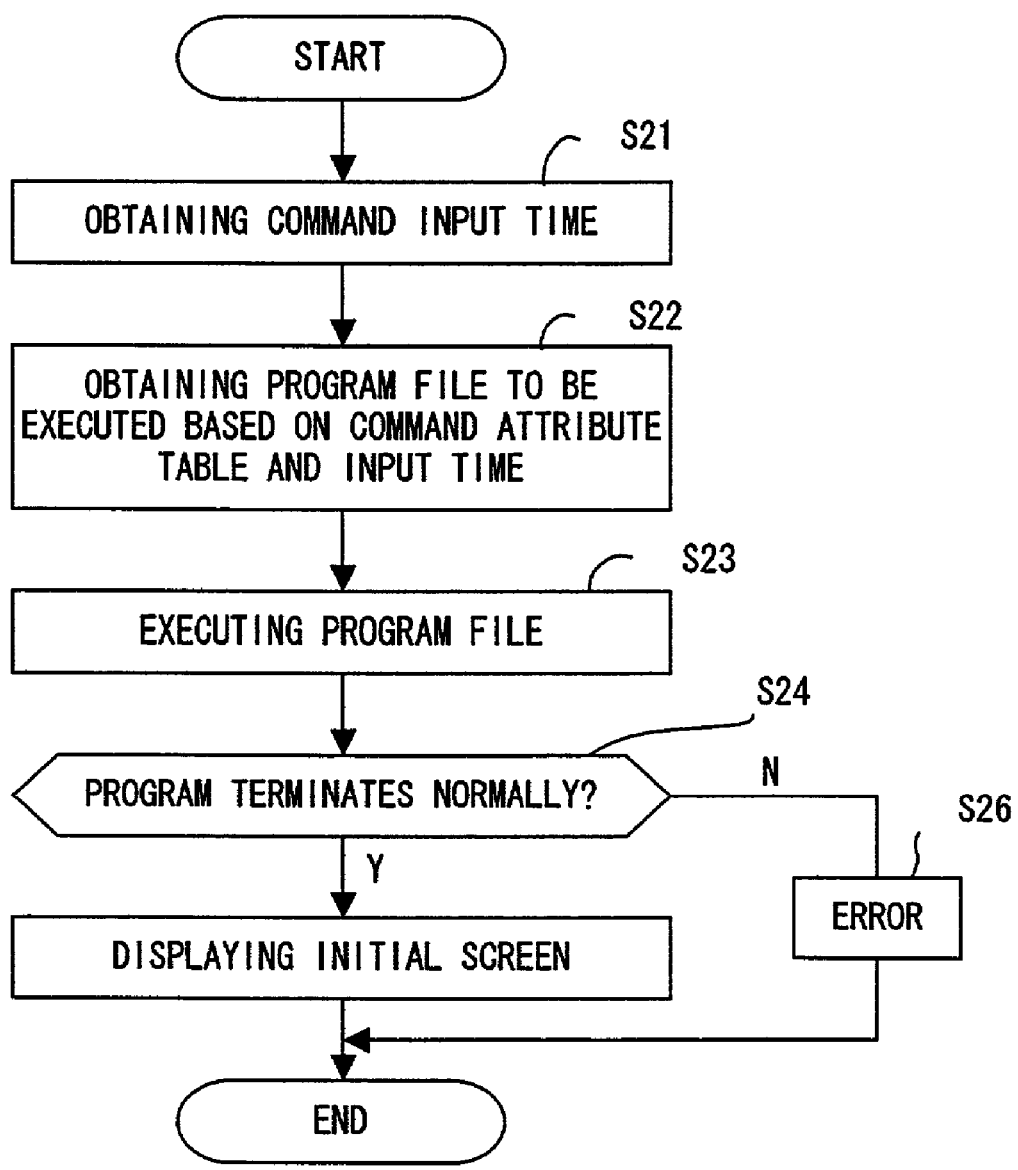
F I G. 1 0

COMMAND INPUT DEVICE, COMMAND INPUT METHOD, AND STORAGE MEDIUM

BACKGROUND OF THE INVENTION

1. Field of the Invention

This invention is related to a command input method in a GUI environment.

2. Description of the Related Art

At present, a command input method in a GUI (Graphical User Interface) environment is executed by designating a button to which a desired process (function) is assigned, from among the buttons displayed on a screen, while clicking the button using a mouse or touching the button by finger or using a dedicated pen or the like.

There is a case, for example, at a business occasion, etc., that a plurality of relevant processes are executed step-by-step. Here, the case that a series of processes such as "calculation", "data updating", and "printing" are executed step-by-step, is exemplified. In this example, buttons for "calculation", "data updating", and "printing" processes are respectively displayed. A user sequentially operates the respective buttons, and executes a series of the processes step-by-step. At first, a "calculation" button is clicked, and a calculation process is executed, thereby displaying a calculation result confirmation screen. After this screen is viewed, an "updating" button is clicked, and a data updating result confirmation screen is displayed. After this screen is viewed, a "printing" button is clicked, and a printing process starts.

However, in the case that an operation procedure such as "calculation"→"updating"→"printing" is fixed, users with advanced skills (experience) and the like may wish to collectively execute the processes without respectively displaying confirmation screens of calculation results, etc., during the process. Depending on the occasion, however, there is a case that the confirmation screen is respectively displayed and the results should had better be respectively confirmed, or there is a case that the results need not be confirmed at all. Conventionally, however, a user had to sequentially operate a plurality of buttons regardless of his/her skill, situation, etc., and he/she had to execute processes while respectively displaying confirmation results.

With regard to such a problem, it is conceivable that a plurality of processes (execution files) are assigned to one button, and a plurality of processes are executed step-by-step by one operation of a button. However, such a process is intended for a user with a low skill level, too.

In order to solve this problem, two methods are conceivable.

The first method is to provide, in addition to respective buttons of "calculation", "updating", and "printing" processes, a new button that can collectively execute these processes.

In this method, however, the required number of buttons increases. Generally, the processes that are required especially at a business occasion includes not only the above-mentioned "calculation" process but also various kinds of processes. Therefore, if the number of buttons significantly increases, a user cannot easily handle the buttons. Further, it is conceivable that there is a case that a space required for a new button does not exist. (This will especially be the case if the screen is small like, as in a mobile device, where space is limited. Also it is difficult to operate a button when the button is made small.)

As for the second method, screens for a user with a high skill level and for a user with a low skill level are separately prepared, and accordingly a screen is changed in accordance with a user. This method is realized by changing the master setting before a user uses the device.

FIGS. 1A and 1B show specific examples of the second method. For example, when the content of "button arrangement" is set to "step-by-step process arrangement" on a master screen as shown in FIG. 1A before a user with a low skill level uses the device, a business screen is provided with three buttons to which respective processes such as "calculation", "updating", and "printing" processes are assigned.

On the other hand, before a user with a high skill level uses a device, the content of "button arrangement" is set to "simultaneous process arrangement" on a master screen, as shown in FIG. 1B. Accordingly, a button for collectively executing the above-mentioned three processes (here, the display word is "printing") is displayed on a business screen.

In this second method, the number of buttons does not increase as in the first method. Therefore, a problem such that the device cannot cope with the case that there is no space for a new button, will rarely occur. Whenever a user changes, however, the setting should be changed on a master screen as occasion demands before the device is used, which is troublesome for a user. Concerning an operation for a short period of time after the setting of a master screen is changed, a longer period of time may be required in a case where the three buttons are sequentially operated. Further, it is difficult for a user with a low skill level for change the setting on a master screen.

In a conventional method, a main program related to a GUI should be changed when a new button is added, or when the function of a button is changed.

SUMMARY OF THE INVENTION

The object of the present invention is to offer a command input device and a command input method that can execute one or a plurality of processes by one operation in accordance with a depress button time, and accordingly functions can be added/changed without changing a program, in a GUI environment.

The first invention of the present application is a computer-readable storage medium that records a program for realizing a function (1) of registering and storing a process to be assigned to each button on a screen, and a function (2) of determining, when an operation is made for an optional button, one or a plurality of processes to be executed in accordance with input time of the button, in reference to the stored contents, thereby executing the process/processes even in the case that a plurality of processes are assigned to the button.

By causing a computer to execute the program that is recorded in a storage medium based on the above-mentioned first invention, an optional process or a plurality of optional processes can be selectively executed by one operation of a button, after changing the input time of a button. In this way, the required number of buttons is small in comparison with the number of processes, which is especially effective in the case that many processes have to be executed or a space for arranging buttons is limited. Even in the case of the addition/change of processes, processes can be executed only by changing the registration contents of a registration/storage unit without changing a program.

The second invention of the present invention is a computer-readable storage medium recording a program for executing a function (1) of storing, in the case that a plurality of processes to be sequentially executed are assigned to an optional button, the plurality of execution file names while corresponding to an input time range, and a function (2) of obtaining, when an operation is executed for an optional button, all the execution file names corresponding to a time range that is determined by input time and input time determination start time of the button, from the stored contents, and executing processes of all the execution file names, thereby updating a value of the above-mentioned input time determination start time.

By causing a computer to execute the program based on the second invention of the present application, the style of executing processes can be freely changed in accordance with a user's skill and situation, and also the input time of a button. For example, a plurality of processes to be sequentially executed can be executed step-by-step, part of the processes can be collectively executed, or all the processes can be collectively executed. Therefore, the number of buttons does not increase (conversely, the number can be decreased), and the operation of a setting change is not required on a master screen, which occurs in a conventional method.

The storage medium of the second invention of the present application further records a program for causing a computer to execute a function (1) of storing a display word and/or a display color to be displayed on a button in each input time range while corresponding to each input time range, and a function (2) of determining and displaying a display word and/or a display color to be currently displayed during the input operation of an optional button, based on the input time determination start time and elapsed time between an input operation start point and the present point.

In this way, a user can recognize in real time timing he/she terminates an input process (removes his/her finger from the button) during the input operation of a button, for the manipulation of his/her desired process.

Further, a storage medium may record a program for causing a computer to execute a function (1) of storing a plurality of abbreviations of a plurality of processes and a function (2) of displaying the plurality of abbreviations on the button to which the plurality of processes are assigned at the initial stage of the screen display.

In this way, a user can identify at a glance to which button a plurality of functions are assigned and which functions are assigned to this button.

A command input device of the present invention is provided with a registration/storage unit for registering and storing the information about a process of assigning functions to each button on a screen, and a process execution unit for referring to the registration/storage unit when an operation is executed for an optional button, and for determining and executing one or a plurality of processes to be executed according to the input time of the button, in the case that a plurality of processes are assigned to the operated button.

BRIEF DESCRIPTION OF THE DRAWINGS

FIGS. 1A and 1B illustrate an explanation of a method of changing to the screen that meets the user's requirement by the setting of a master screen;

FIG. 2 is a block diagram showing the outline of the process procedure of a command input method according to the present preferred embodiment;

FIG. 3 shows one example of a command attribute table;

FIGS. 8A to 8C illustrate examples of executing a series of processes such as "calculation", "data updating", and "printing" processes step-by-step, while confirming the result for each process;

FIGS. 9A and 9B illustrate examples of collectively executing "data updating" and "printing" processes after only executing a "calculation" process and confirming the result;

FIG. 10 is a flowchart explaining the process of the command execution unit of another preferred embodiment;

DESCRIPTION OF THE PREFERRED EMBODIMENT

Figure 4:
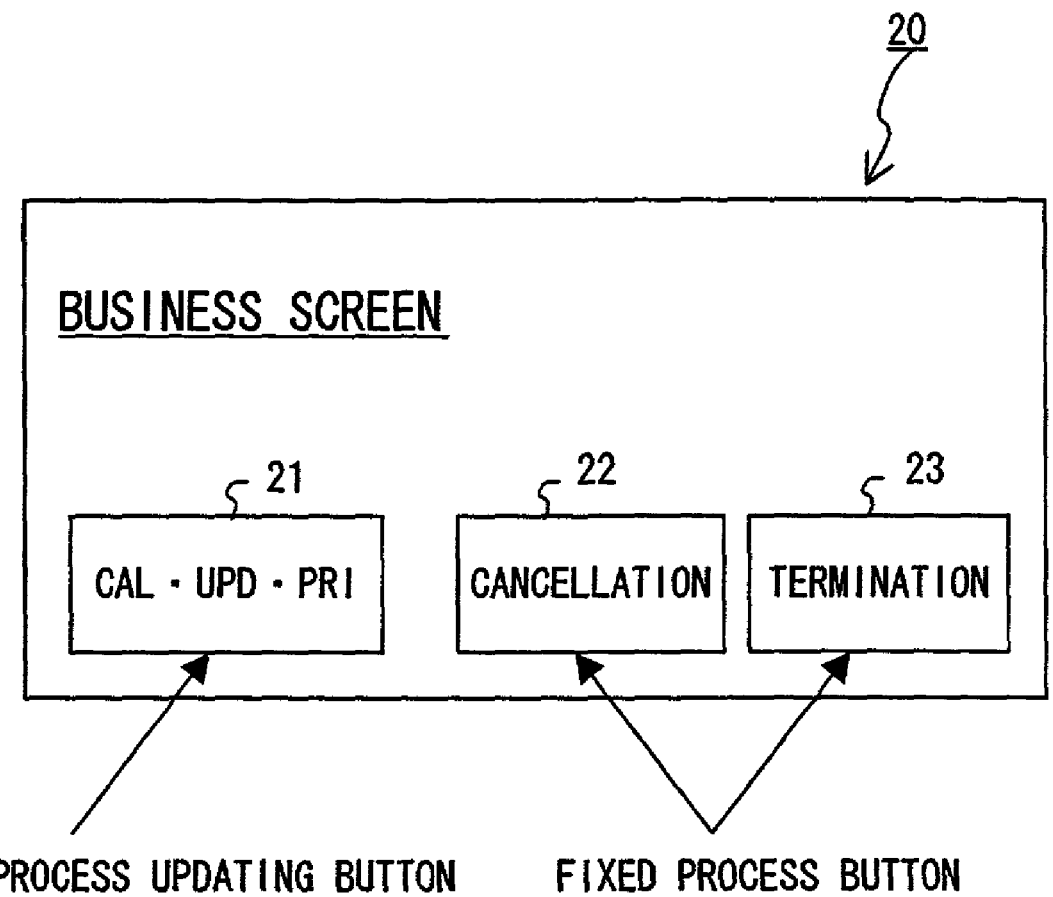
FIG. 4 shows one example of the initial screen of a business screen.

The following is an explanation of the preferred embodiments of the present invention with reference to the drawings.

FIG. 2 is a block diagram showing the outline of the process procedure of a command input method according to the present preferred embodiment.

According to the outline of a process procedure of the command input method of the preferred embodiment, a command display unit 2 controls an initial screen display, an execution process display unit 3 controls the screen display during operation, and a command execution unit 4 executes the process in accordance with the operation (time), on the basis of the information that is registered in advance by an execution process registration unit 1. Meanwhile, it can be said that the command display unit 2 is an initial screen display control unit, while the execution process display unit 3 is a display control unit.

The execution process registration unit 1 is a function unit for causing a user to register in advance the information about the process (function) that is assigned to each button, thereby storing/holding the registered information. Considering the button to which a plurality of processes are assigned, the information about a program file name and the display of a button corresponding to each process is registered corresponding to each command input time to be stored. The details of the process are explained, with reference to FIG. 2, later.

The command display unit 2 is a function unit for displaying the process name that is assigned on each button with reference to the above-mentioned registration information that is stored/held in the execution process registration unit 1 at the time of actuating a screen or the like (in addition to, when a user is not performing a command input operation). Especially, a button to which a plurality of processes are assigned (hereinafter, referred to as a process-changeable button) is configured to display which processes are assigned, thereby enabling a user to recognize which processes are assigned to the button when a user views the screen. The details are explained later in FIG. 4.

The execution process display unit 3 refers to the information that is held and stored by the execution process registration unit 1, and it changeably displays in real time which process is being executed when a current operation terminates at that time (if a user removes his/her finger from the button) while a user is performing an operation with a process-changeable button (while a user keeps a button depressed). The details are explained later in FIG. 5 or the like.

The command execution unit 4 determines a process designated by a user (determined based on a timing at which a command input operation terminates, in the case of a process-changeable button) with reference to the registration information stored/held by the execution process registration unit 1, thereby executing the designated process. The details are explained later in FIG. 7 and the like.

FIG. 3 is a drawing showing one example of the registration information held/stored by the execution process registration unit 1 (command attribute table).

A command attribute table 10 of FIG. 3 is provided with respective data items of a command name 11, a command attribute 12, an input start time 13, an input termination time 14, a program file name 15, a display word 16, an abbreviation 17, and a command color 18.

In the command name 11, a command name corresponding to each button is stored. The information about at which button on a screen the button corresponding to each command is positioned, is stored separately.

In the command attribute 12, attribute information about whether each button is a process-changeable button or a general button is stored.

The input start time 13 and the input termination time 14 show the command input time range corresponding to each process assigned to a process-changeable button.

In the program file name 15, the respective execution file names of a plurality of processes (functions) assigned to a process-changeable button are stored corresponding to the respective command input time ranges. The details are described later, but the command execution unit 4 searches for the command input time range corresponding to the actual command input time according to the user's operation, and it reads out the program file name that corresponds to the range, thereby executing the required process.

In the display word 16, words to be displayed on a button are stored. Concerning a process-changeable button, the word on the button is changed during the command input operation performed by a user, as described later. Therefore, a corresponding word is stored for each command input time range.

In the abbreviation 17, a word (displayed as an abbreviation) to be displayed on a button of an initial screen, is stored with respect to a process-changeable button.

In the command color 18, the display color of a button is stored. Concerning a process-changeable button, since the color of a button is changed during the command inputting operation by a user as described later, a corresponding display color is stored for each command input time range.

At the time of causing a user to change/register the information about a command assigned to each button, the execution process registration unit 1 displays a registration screen (not shown in the drawings) using the command attribute table 10, thereby causing a user to execute the registration operation.

The following are specific examples of process functions of the command display unit 2, the execution process display unit 3, and the command execution unit 4, taking a case of using the command attribute table 10 of FIG. 3, as an example.

First, the command display unit 2 is explained.

The command display unit 2 displays a word on a button with reference to the command attribute table 10, at the time of actuating a business screen or the like. Further, it displays the color of a button.

For each command name 11 of the command attribute table 10, in the case that the command attribute 12 is a "fixed process", the command display unit 2 determines this command as a command of a single function, and it directly displays a word of the display word 16 on the button. At that time, the color of a button is changed to the color of the command color 18 (gray). On the other hand, in the case that the command attribute 12 is a "changeable process", the command is determined as a command with a plurality of processes, and a plurality of abbreviations stored in the abbreviation 17 are displayed in a row. For example, when the command name 11 is a "calculation button", the abbreviation 17 is "cal", "upd", and "pri", and these are displayed in a row.

Concerning a business screen 20, a "cal, upd, and pri" button 21 is displayed as the button of a process-changeable button on the initial screen, as shown in FIG. 4 while a "cancellation" button 22 and a "termination" button 23 are displayed as a process-fixed button.

In this way, a user can recognize that a plurality of functions are assigned to the button 21, and that these functions are "calculation/updating/printing" processes.

Figure 5:
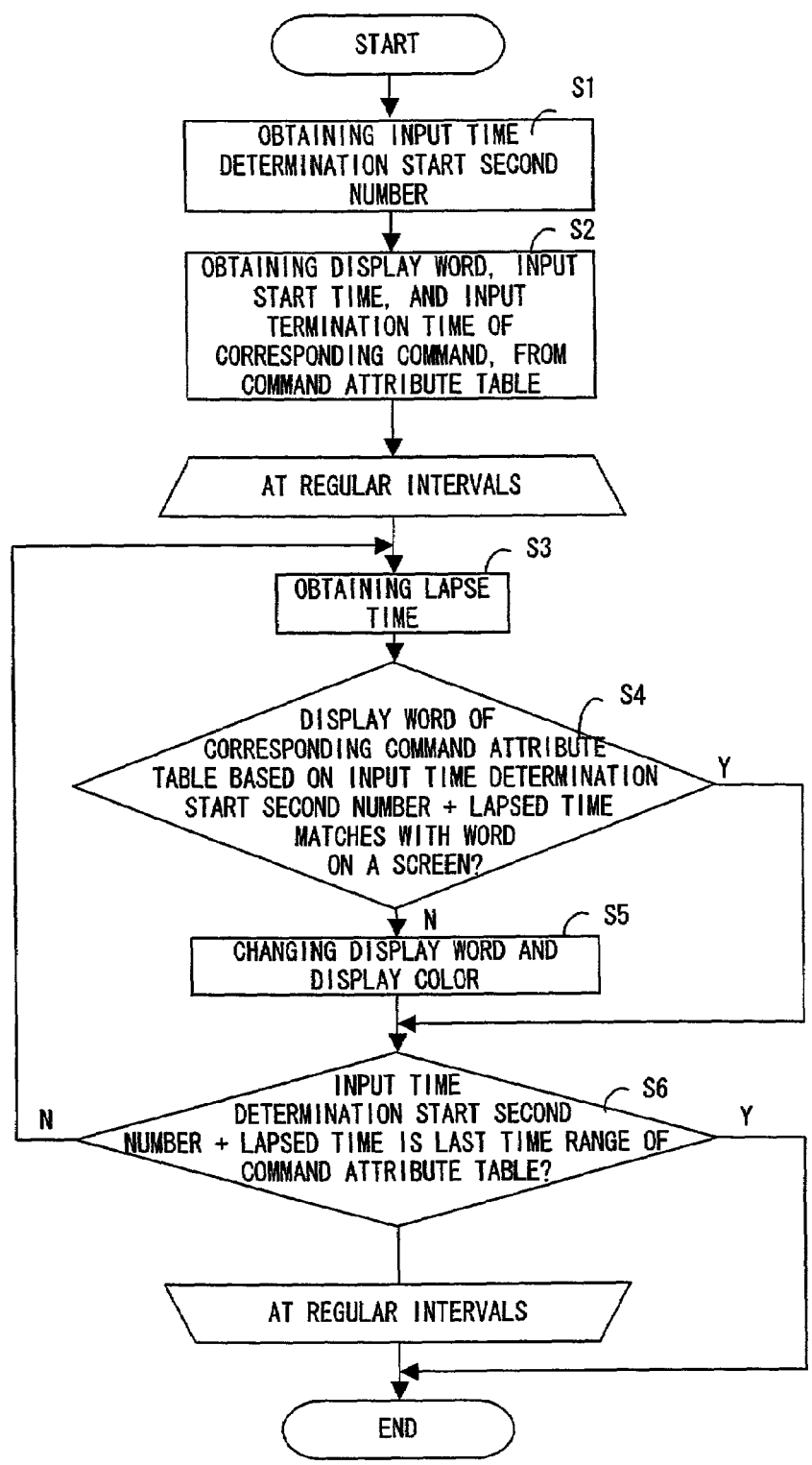
FIG. 5 is a flowchart explaining a business screen display process during the command input operation by a user.

The following is an explanation of the process function of the execution process display unit 3 with reference to FIGS. 5 and 6.

Firstly, when an optional button is operated by a user, the execution process display unit 3 refers to the command attribute 12 that corresponds to the operated button, and it does not execute any process in the case that the button is a "fixed process" (it leaves the display as the initial screen shown in FIG. 4).

In the case of a "changeable process", however, a process shown in FIG. 5 is executed.

Figure 6A:
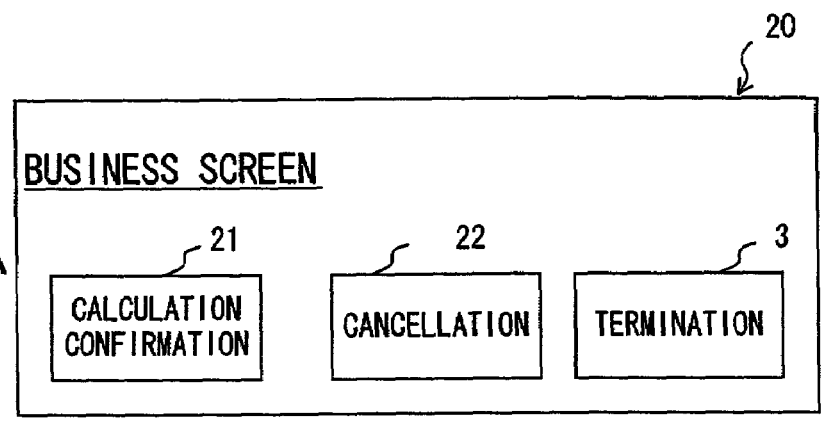
FIGS. 6A to 6C illustrate the situations such that the display contents of a screen are changed by performing the process of FIG. 5.
Figure 6B:
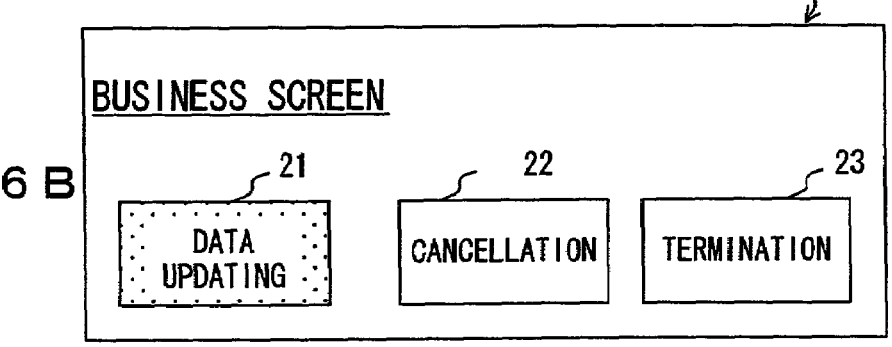
Figure 6C:
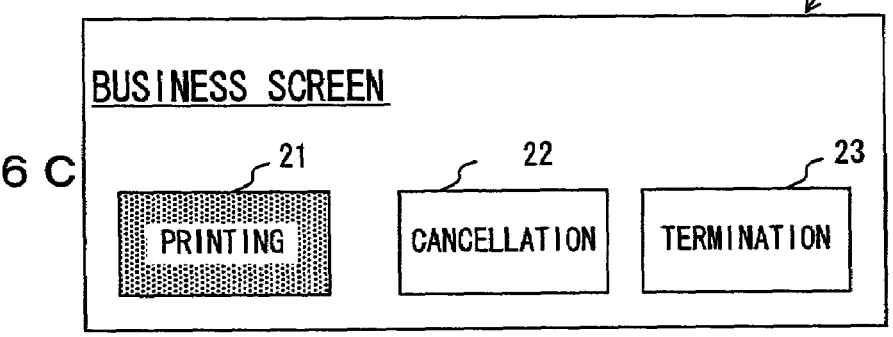

The following is an explanation of the process shown in FIG. 5, taking the case that the button 21 of FIG. 4 is operated, as an example. Also, the situation such that the display contents of a screen are changed during the operation of this process is shown in FIGS. 6A to 6C.

In FIG. 5, the execution process display unit 3 obtains an input time determination start second number (step S1). The input time determination start second number is stored, for example, in a specific variable memory, etc., thereby reading out this number to be obtained. The input time determination start second number is "0" seconds in the initial state, but this number is updated by a process at step S17 that is described later.

At first, the operation starts at an initial screen shown in FIG. 4. Therefore, an input time determination start second number="0 second" is obtained.

Subsequently, the execution process display unit 3 refers to the command attribute table 10, obtains each display word 16 that is related to the operated button and the corresponding input time range (range between the input start time 13 and the input termination time 14), and stores these items temporarily (step S2).

Then, the execution process display unit 3 executes processes at steps S3 to S6 at regular intervals (for example, at 0.1-second intervals) while a user continues to depress a button (a process terminates not only in the case of YES at step S6, but also in the case that a user removes his/her finger from the button, which is not shown in the drawings).

First, elapsed time from the button operation start point specified by a user to the present point is obtained (step S3).

Next, "an input time determination start second number+ elapsed time" is calculated, and a display word corresponding to the input time range in which the calculation result is included is obtained, thereby determining whether this display word agrees with a display word of the button on the current screen(step S4). Since "an input time determination start second number+elapsed time" is 0 seconds, for example, at the first process starting at the initial screen, the display words become "calculation confirmation". Further, since the current screen is an initial screen, the display word on the current screen is "cal•upd•pri" (which is stored in a display word storage range [not shown in the drawings] corresponding to this button) Since the both do not agree each other (step S4, NO), the display words of the button on the screen are changed to "calculation confirmation". At the same time, the color is changed to "yellow green" (step S5) (FIG. 6A)

After that, the display word of a button on the screen is not changed until elapsed time reaches "1.0 second" in this example. When elapsed time becomes "1.0 second", the display words are changed to "data updating" (color changes to green) (FIG. 6B).

Finally, it is determined (step S6) whether "an input time determination start second number+elapsed time" is the last input time range in the command attribute table 10 (step S6), and processes terminate in the case of YES (step S6, YES). That is, it can be determined that processes terminate since no display word to be changed next is present after a display word of the button on a screen is changed to "printing" by the process at step S5 (color changes to dark green) when the elapsed time becomes "2.0 seconds" in this example (FIG. 6C).

However, this is one example, and the present invention is not limited to such an example. For example, even in the case that a display word changes to "printing" due to a user's careless operation when a user intends to remove his/her finger from a button, while "data updating" is being displayed, the button is configured in such a way that the display word changes to "printing"→"calculation confirmation"→"data updating", if the user continues to depress the button. In order to execute such a process, it is necessary to add a process of determining whether "an input time determination start second number+elapsed time" pass the last input time range of the command attribute table 10, instead of, for example, the process at step S6. In the case that it passes the range, a process of returning to step S3 can be added after elapsed time is reset to "0 seconds". In order to execute this process, even the input termination time 14 corresponding to "printing" in the command attribute table 10 should be setup (for example, "2.9 seconds" or the like is set up).

Meanwhile, a display word can be displayed on a button, but it may also be displayed at an optional position on a screen. The same thing can be said about a display color. Incidentally, both the display word and display color may be changeably displayed, or either the display word or display color may be changeably displayed. Further, the present invention is not limited to the display style of a display word or a display color. In short, it is sufficient for a user to recognize which process is executed if he or she terminates the operation immediately.

During the operation of a button by a user (while a user continues to depress a button), one process is executed by the execution process display unit 3. After the operation terminates (a user removes his/her finger from a button), another process is executed by the command execution unit 4.

Figure 7:
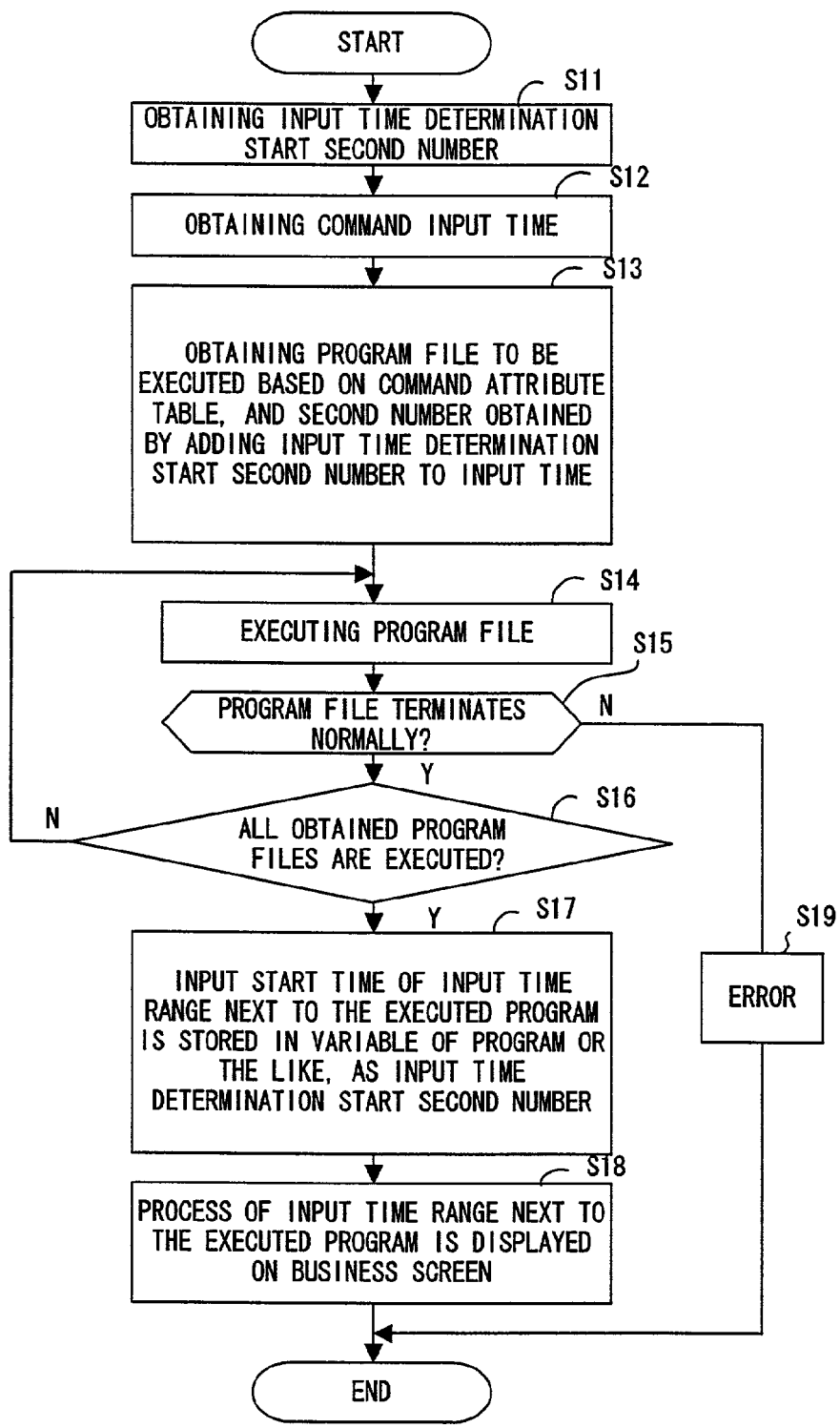
FIG. 7 is a flowchart explaining processes executed by a command execution unit.

FIG. 7 is a flowchart explaining the flow of processes executed by the command execution unit 4.

Firstly, an input time determination start second number stored in the specific variable or the like, for example, of a program, is obtained in a fashion similar to the process at step S1 (step S11). At first, an input time determination start second number="0 seconds" is obtained in a fashion similar to the above-mentioned process.

Subsequently, command input time is obtained (step S12). A command input time is the period of time during which a user continues to depress a button (from the time when a user starts to depress a button until he/she removes his/her finger from a button).

Then, the command attribute table 10 is searched for using the time range between "an input time determination start second number" and "an input time determination start second number+command input time". Then, all the program file names 15 corresponding to the time range between "an input time determination start second number" and "an input time determination start second number+command input time" are obtained as the program file names 15 to be executed (step S13). Even if "an input time determination start second number+command input time" is, for example, 1.7 seconds by using this time range, the program file names 15 (○ ○ ○. exe and Δ Δ Δ. exe) corresponding to a time range between 0 seconds to 1.7 seconds are obtained in the case of an input time determination start second number="0 seconds". On the other hand, in the case of an input time determination start second number="1.0 second", the program file name 15 (Δ Δ Δ. exe) corresponding to the time range between 1.0 second to 1.7 seconds is obtained.

Meanwhile, a process of the present invention is not limited to such an example, but it is applicable to, for example, the process as shown in FIG. 10 which is described later.

Next, the process of a program file that is obtained at step S13 is executed (step S14). In the case that there are a plurality of obtained program files, the processes required at step S14 are sequentially executed until all the processes have been executed (step S16). In the case that the program does not terminate normally (step S15, NO), a process advances to an error process (step S19).

When all the processes of the obtained program file are executed (step S16, YES), "input start time 13" corresponding to the program next to the executed program is stored in the above-mentioned variable storage or the like, as a new input time determination start second number (step S17). When a user starts an operation next time, a business screen is displayed, so a user recognizes that an operation starts at the next program (step S18).

For example, in the case that a process is executed up to a program file (Δ Δ Δ. exe) of an updating process, the input start time 13 corresponding to the program file (XXX. exe) of the printing process that is the next program, is 2.0 seconds. Then, the 2.0 seconds start time is set to a new input time determination start second number (one example of step S17). Further, the display word 16 ("printing") corresponding to the program file (XXX. exe) of this printing process is displayed on a button (one example of step S18).

The following is an explanation of a specific example of the process corresponding to the operation by a user, with reference to FIGS. 8 and 9.

FIG. 8 shows an example of executing a series of processes of "calculation", "data updating", and "printing" step-by-step, while confirming the result of each process.

FIG. 9 shows one example of collectively executing "data updating" and "printing" processes, after executing only a "calculation" process and confirming the result.

Of course, the present invention is not limited to such an example, but it can freely designate the process contents according to a depress time, in such a way that it can collectively execute all the processes of "calculation", "data updating", and "printing", it can execute a "printing" process after executing "calculation" and "data updating" processes, or the like.

In the example of FIG. 8, each of the "calculation", "data updating", and "printing" processes is executed step-by-step. Therefore, it is acceptable to depress a button between 0 seconds to 0.9 seconds, for the execution of a "calculation" process. During 0 seconds to 0.9 seconds period after a button is depressed, since "calculation confirmation" is displayed on a screen as shown in FIG. 8A, a user may remove his/her finger from the button during this display.

Here, it is assumed that the depress button time is 0.6 seconds. At this time, the input time determination start second number is an initial value (=0 seconds), so that when the command attribute table 10 is searched for at step S13 on the basis of a time range between 0 to 0.6 seconds, only the program file (○ ○ ○. exe) of calculation is corresponded to. Therefore, this file is obtained to be executed at step S14.

After the execution of a calculation process, an input time determination start second number becomes 1.0 second at step S17, and the display words on a button become "data updating" that is a process next to a "calculation" process, by executing the process at step S18.

In this way, when a user confirms the calculation process result and attempts to manipulate the next process, he/she manipulates a process on a business screen shown in FIG. 8B at first. In the case that a user wishes to manipulate only a "data updating" process on this business screen next, he/she may depress the button without being concerned with the depress button time (generally, a user does not depress a button for more than one second). Here, assuming that a user depresses a button for 0.7 seconds, the input time determination start second number is 1.0 second at this stage. When the command attribute table 10 is searched for on the basis of the time range between 1.0 to 1.7 seconds at step S13, only the program file (Δ Δ Δ. exe) of updating is corresponded to, and this program is obtained to be executed at step S14.

After the execution of a data updating process, an input time determination start second number becomes 2.0 seconds at step S17, and the display word on a button becomes "printing" which is a process next to a "data updating" process by the process at step S18.

Accordingly, when a user starts the next operation after the data updating process is executed, the business screen changes to the one as shown in FIG. 8C. Here, assuming that a user depresses a button, for example, for 0.6 seconds. And, the input time determination start second number is 2.0 seconds described above. When the command attribute table 10 is searched for on the basis of the time range between 2.0 to 2.6 seconds at step S13, since only the program file (XXX. exe) of printing is corresponded to, this program is obtained to be executed at step S14.

For example, when a user with a low skill level uses this button, he/she can advance the business, while confirming the calculation result and updated data, by performing the above-mentioned operation.

FIG. 9 explains an example of collectively executing "data updating" and "printing" processes after only a "calculation" process is executed and the calculation result is confirmed.

Concerning the execution of only a "calculation" process as shown in FIG. 9A, the execution is the same as that of FIG. 8A, and thus the explanation is omitted here.

After the execution of a calculation process, the input time determination start second number becomes 1.0 second at step S17, and a display words on the button become "data updating" which is a process next to a "calculation" process, by executing the process at step S18.

In this way, a user should manipulate an operation on the business display shown in FIG. 8B when he/she confirms the calculation results and executes the next process. In the case that a user wishes to collectively execute a "data updating" process and a "printing" process on this business screen, he/she may remove his/her finger from the button after he/she continues to depress the button for more than one second and the business screen turns to the one shown in FIG. 9B (after a display word on the button changes to "printing").

Here, assuming that a user depresses a button, for 1.7 seconds. And, the input time determination start second number is 1.0 second described above. When the command attribute table 10 is searched for on the basis of the time range between 1.0 to 2.7 seconds at step S13, since the program file (ΔΔΔ. exe) of a data updating process and that (XXX. exe) of a printing process are corresponded to, these programs are obtained to be sequentially executed by the processes at steps S14 to S16.

When a user with a high skill level uses a button, he/she can execute his/her business efficiently, without unnecessary troubles, by executing the above-mentioned operation.

In the above-mentioned embodiment, the specific order of a plurality of processes assigned to one button is determined in advance at a business occasion, but the present invention is not limited to such an embodiment. For example, the present invention includes the case that a plurality of processes without any relevancy are assigned to one button, and any one of the processes is executed according to the depress button time. In this case, a user can obtain an effect such that the number of buttons is less in comparison with the number of processes (and is significantly effective when a space for arranging buttons on the screen is limited) and another effect such that the function to be assigned to the button is changed/added without changing a main program.

The following is an explanation of such an embodiment.

In another embodiment, the processes of the execution process registration unit 1, the command display unit 2, and the execution process display unit 3 are almost the same as those of the above-mentioned embodiment (however, an input time determination start second number is not required).

The process of the command execution unit 4 of another embodiment is explained with reference to FIG. 10.

In the following explanation of a specific example, the command attribute table 10 of FIG. 3 is used. The explanation, however, is made on the assumption that each process of "calculation", "data updating", and "printing" is not executed in a specific order (no relevancy among the processes).

In the process of FIG. 10, when a user completes the button operation (when a user removes his/her finger from the button), the command input time (depress button time) is obtained (step S21).

Next, the command attribute table 10 is searched for, and it is determined in which time range the depress button time obtained at step S21 is included (between input start time 13 and input termination time 14). Then, the program file name 15 corresponding to the time range is obtained (step S22). For example, in the case that the depress button time is 2.3 seconds, the program file name (XXX. exe) of "printing" is obtained.

Then, the obtained program file is executed (step S23). At that time, it is checked whether the program terminates normally (step S24), and if not (step S24, NO), a process may advance to an error process (step S26).

If the program terminates normally (step S24, YES), a process returns to the initial screen as, for example, FIG. 4 (step S25).

In the above-mentioned explanation, only one program file is executed by one operation. However, one or a plurality of program files can be executed by one operation, while the process contents are the same as those of FIG. 10. This can be realized by changing the setting of the contents of the command attribute table 10.

In the program file name 15 of the command attribute table 10 shown in FIG. 3, "○ ○ ○. exe" corresponding to the range between 0 to 0.9 seconds of depress button time, "Δ Δ Δ. exe" corresponding to the range between 1.0 to 1.9 seconds, and "XXX. exe" corresponding to 2 and the subsequent seconds are registered. For example, the input termination time 14 corresponding to "XXX. exe" is newly set (for example, 2.9 seconds). Further, the name of a program file (newly prepared) for realizing the process of "○ ○ ○. exe+Δ Δ Δ. exe" is registered as the program file name 15 corresponding to the time range of which the input start time 13 is 3.0 seconds and of which the input termination time 14 is 3.9 seconds. Otherwise, the program file name 15 may be registered as "○ ○ ○. exe+Δ Δ Δ. exe".

In a similar fashion, the program file name for realizing the process of "Δ Δ Δ. Exe+XXX. exe" corresponding to a time range between 4.0 and 4.9 seconds, and the process of "○ ○ ○. exe+Δ Δ Δ. Exe+XXX. exe" corresponding to a time range between 5.0 and 5.9 seconds, may be registered.

In this way, in the case that the depress button time is 3.5 seconds, the processes of ○ ○ ○. exe and Δ Δ Δ. exe are executed. Therefore, a plurality of processes can be collectively executed by one operation. This indicates that the process flow of FIG. 10 is applicable to "a plurality of processes that are determined in advance to be executed in specific order, at a business occasion". In the process of FIG. 7, a case such that after, for example, only "○ ○ ○. exe" is executed, "XXX. exe" is executed next due to the user's operation error (processes are not executed in order), can be avoided. In the process of FIG. 10, however, this case occurs.

In other words, an effect such that processes are executed in specific order can be obtained by the process of FIG. 7, even if a user is not especially concerned with the order.

Figure 11:
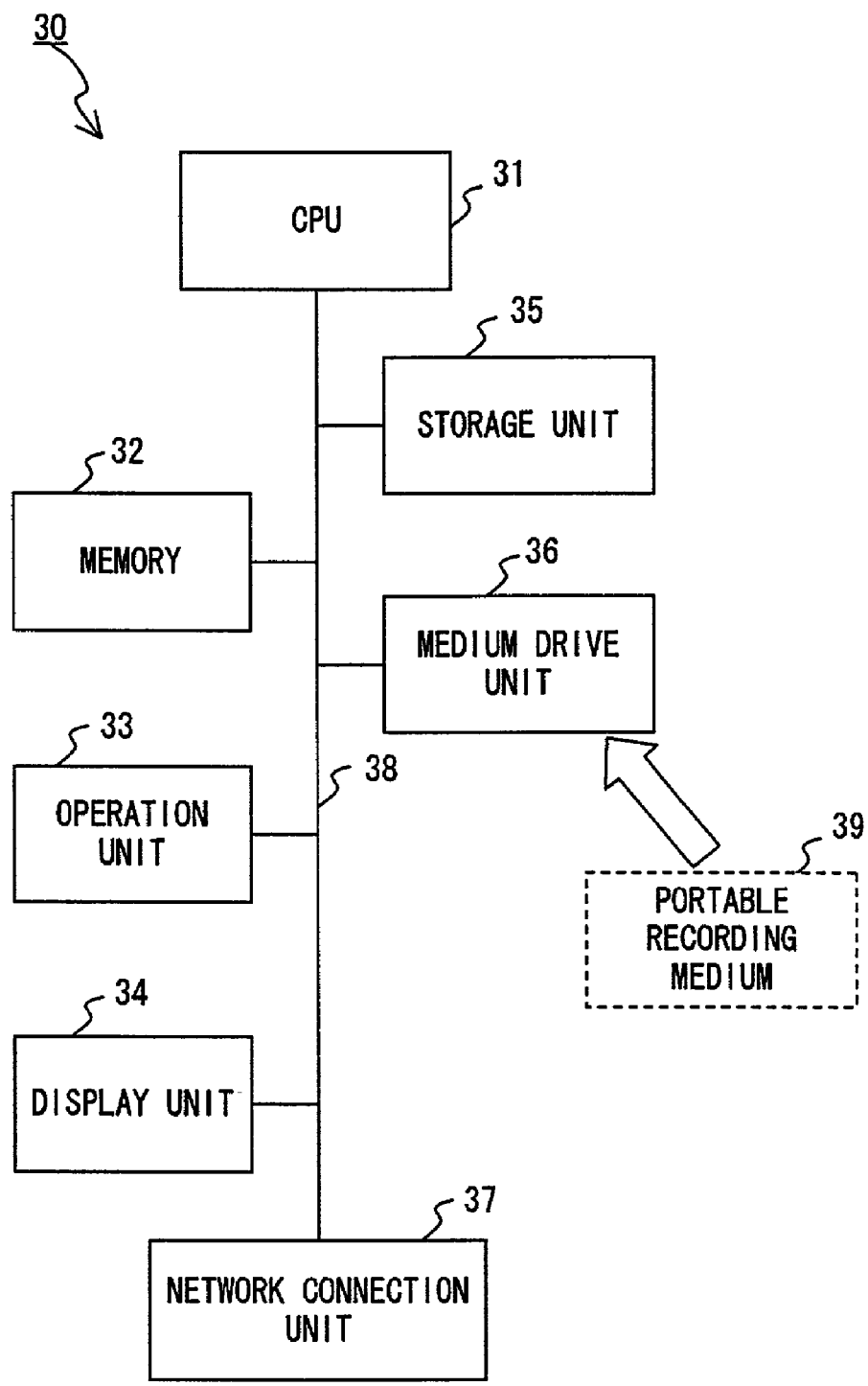
FIG. 11 is a block diagram showing one example of the hardware constitution of a data processing device for realizing a command input device of the present preferred embodiment.

FIG. 11 is a block diagram showing one example of the hardware constitution of the data processing device for realizing a command input device according to the present preferred embodiment.

The data processing device for realizing the command input device according to the present embodiment is a portable data processing device, etc., such as a personal computer, a notebook-size personal computer, a PDA/hand-held personal computer and the like.

A data processing device 30 of FIG. 11 is provided with a CPU 31, a memory 32, an operation unit 33, a display unit 34, an external storage 35, a medium drive unit 36, a network connection unit 37 etc., which are connected by a bus 38. The configuration shown in this drawing is one example, and the present invention is not limited to this example.

The CPU 31 is a central processing device for controlling the whole data processing device 30.

The memory 32 is a memory of a RAM, etc., for temporarily storing the program or the data that is recorded in the external storage 35 (or a portable storage medium 39) when programs are executed, data is updated, or the like. The CPU 31 executes various above-mentioned processes using programs/data read out from the memory 32.

The operation unit 33 is, for example, a keyboard, a mouse, a touch panel, and others.

The display unit 34 is a display, and others.

The external storage 35 is, for example, a magnetic disk drive, an optical disk device, a magneto-optical disk, and others. In this storage, the program/data for realizing the various functions as the above-mentioned command input device (data shown in FIG. 3, and program for executing the processes shown in FIGS. 5, 7, and 10) are stored.

The medium drive unit 36 reads out the program/data and the like that are stored in the portable storage medium 39. The portable storage medium 39 is, for example, a FD (Flexible Disk), a CD-ROM, a DVD, a magneto-optical disk, or the like.

The network connection unit 37 is connected to a network, and it can transmit/receive programs/data to/from an external data processing device.

Figure 12:
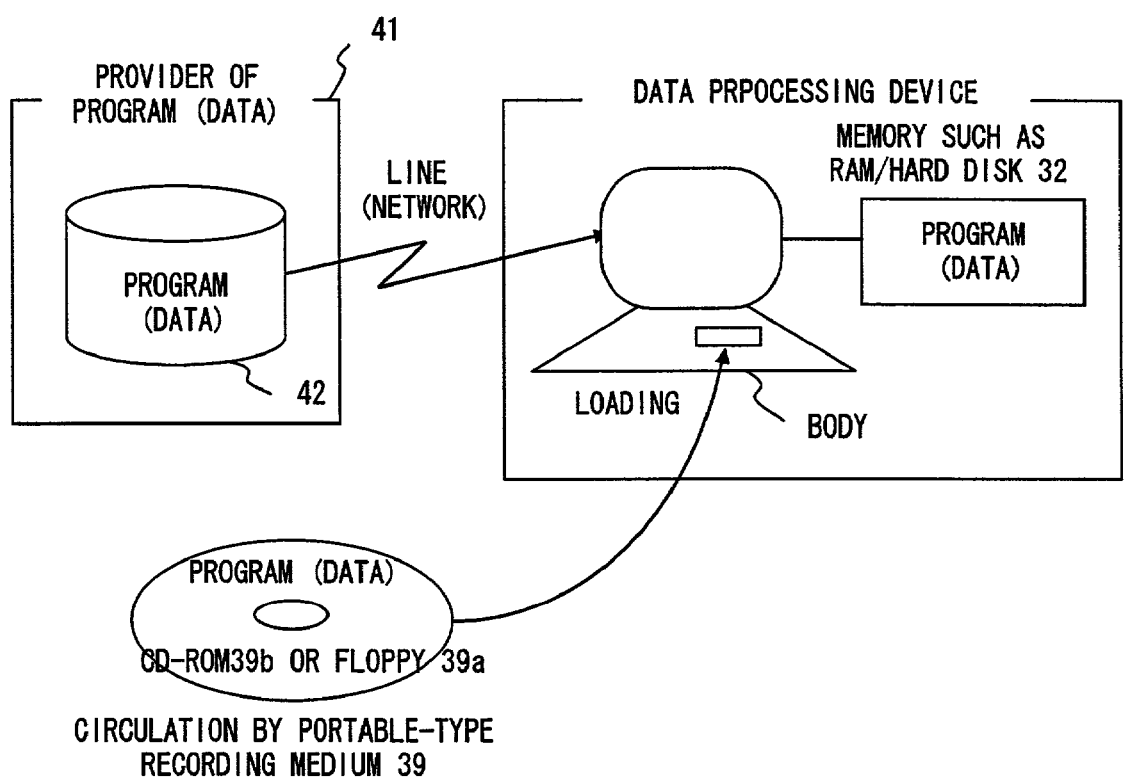
FIG. 12 is a block diagram showing one example of a storage medium for storing the program realizing a command input device of the present preferred embodiment.

FIG. 12 is a block diagram showing one example of a storage medium.

As shown in the drawing, programs/data are read out on the data processing device side from the portable storage medium 39 (for example, FD39a and CD-ROM39b) in which programs/data for realizing the above-mentioned functions of the present invention are stored, thereby storing the programs/data in the memory 32 to be executed.

Further, the above-mentioned program/data may be the one (transmission signal) obtained by downloading the program/data that is stored in a storage unit 42 of a device 41 on an external data provider side, through the network (Internet, etc.) which is connected by the network connection unit 37.

The present invention is not limited to a specific device/method, but it can be configured as the storage medium (portable storage medium 39, etc.) for storing the above-mentioned program/data.

As explained in detail, according to a command input device and a command input method of the present invention, a plurality of processes are assigned to one button, and one or the plurality of processes can be executed by one operation in accordance with a depress button time, in a GUI environment. This enables the number of buttons arranged on a screen to become smaller in comparison with the number of processes. Further, only by changing a depress button time in accordance with a user's skill level or a condition, a user can select how to execute processes, for example, whether processes are executed step-by-step or whether processes are collectively executed. Still further, by registering/storing information about processes assigned to each button, and referring to this information by a main program at the time of a button operation, one or a plurality of processes can be executed. Therefore, in the case that a process is added/changed, the registration contents can only be updated, and the need to change a main program is not required. Furthermore, a user can recognize at real time, the process contents to be executed at the timing, during the operation of a button. In addition, a user can recognize a plurality of process contents assigned to a button at an initial screen.

What is claimed is:

1. A storage medium for storing a program enabling a computer to execute a method comprising:
   in a case that a plurality of processes to be sequentially executed are assigned to an optional button on a screen,
      storing execution file names of the processes in correspondence with respective input time ranges and at least one of a display word and a display color to be displayed on the optional button in each input time range; and
   when an input operation is performed using the optional button,
      determining and displaying at least one of a current display word and a current display color to be currently displayed based on an input-time-determination start time, an elapsed time from an input operation start point to a present point, and storage contents, during the input operation of the optional button;
      obtaining selected execution file names, corresponding to the input time range determined by a current value of the input-time-determination start time and the elapsed time for the input operation of the optional button, from the storage contents,
      executing processes of the selected execution file names, and
      obtaining a new value for the input-time-determination start time based on the current value of the input-time-determination start time and the elapsed time for the input operation of the optional button.

2. A computer-readable storage medium for storing a program enabling a computer to execute a method comprising:
   storing, in correspondence with input time ranges, execution file names of a plurality of processes to be sequentially executed that are assigned to an optional button on a screen; and
   each time an input operation is performed using the optional button,
      obtaining at least one of the execution file names corresponding to an input time range determined by a current value of an input-time-determination start time and an elapsed time of the input operation performed using the optional button,
      executing at least one process corresponding to the at least one execution file name, and
      determining a new value for the input-time-determination start time based on the current value of the input-time-determination start time and the elapsed time of the input operation performed using the optional button.

3. The storage medium according to claim 2, said method further comprising:
   storing a plurality of abbreviations for the plurality of processes, respectively; and
   displaying the plurality of abbreviations in line on a button to which the plurality of processes are assigned at an initial display stage of the screen.

4. A command input device comprising:
   a storage unit storing, in correspondence with input time ranges, execution file names of processes to be sequentially executed that are assigned to an optional button on a screen; and
   a process execution unit detecting each input operation performed using the optional button, obtaining from the storage unit at least one of the execution file names corresponding to an input time range determined by a current value of an input-time-determination start time and an elapsed time of each input operation performed using the optional button, executing at least one process corresponding to the at least one execution file name, and obtaining a new value of the input-time-determination start time based on the current value of the input-time-determination start time and the elapsed time of the input operation performed using the optional button.

5. A command input method comprising:
   storing, in correspondence with input time ranges, execution file names of processes to be sequentially executed that are assigned to an optional button on a screen; and
   each time an input operation is performed using the optional button,
      obtaining at least one of the execution file names corresponding to an input time range determined by a current value of an input-time-determination start time and an elapsed time of the input operation performed using the optional button,
      executing at least one process corresponding to the at least one execution file name, and
   determining a new value for the input-time-determination start time based on the current value of the input-time-determination start time and the elapsed time of the input operation performed using the optional button.

* * * * *